(12) United States Patent
Massicotte et al.

(10) Patent No.: US 11,926,008 B2
(45) Date of Patent: Mar. 12, 2024

(54) TOOLS AND METHODS FOR ASSEMBLING A SEAL DEVICE OF A GAS TURBINE ENGINE

(71) Applicant: Pratt & Whitney Canada Corp., Longueuil (CA)

(72) Inventors: Francois Massicotte, Laval (CA); Maxime Desgagne, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/562,482

(22) Filed: Dec. 27, 2021

(65) Prior Publication Data
US 2023/0201979 A1    Jun. 29, 2023

(51) Int. Cl.
    *B23P 19/027*     (2006.01)
    *F01D 11/00*     (2006.01)

(52) U.S. Cl.
    CPC ............ *B23P 19/027* (2013.01); *F01D 11/00* (2013.01); *F05D 2220/32* (2013.01); *F05D 2230/60* (2013.01); *F05D 2240/55* (2013.01)

(58) Field of Classification Search
CPC . Y10T 29/49297; F01D 25/16; F01D 25/162; F01D 25/285
See application file for complete search history.

(56) References Cited

U.S. PATENT DOCUMENTS

| | | | |
|---|---|---|---|
| 2,982,999 A * | 5/1961 | Stewart | B29C 43/027 277/575 |
| 3,063,097 A * | 11/1962 | Jutzi | B29C 43/18 277/575 |
| 3,090,996 A * | 5/1963 | Reichenbach | F16J 15/328 277/924 |
| 3,743,302 A | 7/1973 | Bach | |
| 7,565,257 B2 | 7/2009 | Lee | |
| 11,141,766 B2 | 10/2021 | Cerovsky | |
| 2020/0313416 A1 | 10/2020 | Warren | |
| 2020/0318490 A1 | 10/2020 | Miller | |
| 2021/0332889 A1 | 10/2021 | Nasman | |

FOREIGN PATENT DOCUMENTS

GB     2320527 A     6/1998

OTHER PUBLICATIONS

EP search report for EP22217200.9 dated May 24, 2023.

* cited by examiner

*Primary Examiner* — Tyrone V Hall, Jr.
(74) *Attorney, Agent, or Firm* — Getz Balich LLC

(57) ABSTRACT

A seal device includes a first sidewall, a second sidewall and a carbon seal element. The first sidewall is arranged with a first tool die which centers the first sidewall about an axis. The first sidewall axially contacts the first tool die along the axis. The carbon seal element is arranged with a centering element which centers the carbon seal element about the axis. The carbon seal element circumscribes and radially contacts the centering element. The second sidewall is arranged with a second tool die which centers the second sidewall about the axis. The second sidewall axially contacts the second tool die along the axis. The first tool die and the second tool die are moved axially together along the axis to press fit the second sidewall into a bore of the first sidewall and axially capture the carbon seal element between the first sidewall and the second sidewall.

19 Claims, 4 Drawing Sheets

TOOLS AND METHODS FOR ASSEMBLING A SEAL DEVICE OF A GAS TURBINE ENGINE

TECHNICAL FIELD

This disclosure relates generally to a gas turbine engine and, more particularly, to assembling a seal device of the gas turbine engine.

BACKGROUND INFORMATION

Various tools and methods are known in the art for use in assembling a seal device of a gas turbine engine. While these known tools and methods have various benefits, there is still room in the art for improvement. There is a need in the art therefore for improved tools and methods for assembling a seal device of a gas turbine engine.

SUMMARY

According to an aspect of the present disclosure, a tool is provided for assembling a seal device of a gas turbine engine. This tool includes a first tool die, a second tool die, a centering element and an actuator. The first tool die includes a first die base, a first die curb and a first die bumper. The first die curb projects axially out from the first die base along an axis. The first die curb extends circumferentially about the axis. The first die bumper is spaced radially outward from the first die curb by a first die channel. The first die bumper projects axially out from the first die base along the axis. The first die bumper extends circumferentially about the axis. The second tool die includes a second die base, a second die curb and a second die bumper. The second die curb projects axially out from the second die base along the axis. The second die curb extends circumferentially about the axis. The second die bumper is spaced radially outward from the second die curb by a second die channel. The second die bumper projects axially out from the second die base along the axis. The second die bumper extends circumferentially about the axis. The centering element extends axially along and circumferentially about the axis. A receptacle is configured to receive the seal device. The receptacle extends axially along the axis within the tool between the first tool die and the second tool die. The receptacle projects radially inward into the tool to the centering element. The actuator is configured to axially press the seal device between the first tool die and the second tool die.

According to another aspect of the present disclosure, a manufacturing method is provided during which a seal device of a gas turbine engine is provided. The seal device includes a first sidewall, a second sidewall and a carbon seal element. The first sidewall is arranged with a first tool die. The first tool die includes a first die curb and a first die bumper. The first sidewall radially engages and is centered about an axis by the first die curb. The first sidewall axially engages the first die bumper. The carbon seal element is arranged with a centering element. The carbon seal element circumscribes the centering element. The carbon seal element radially engages and is centered about the axis by the centering element. The second sidewall is arranged with a second tool die. The second tool die includes a second die curb and a second die bumper. The second sidewall radially engages and is centered about the axis by the second die curb. The second sidewall axially engages the second die bumper. The first tool die and the second tool die are moved axially together along the axis to assembly the seal device.

According to still another aspect of the present disclosure, a manufacturing method is provided during which a seal device of a gas turbine engine is provided. The seal device includes a first sidewall, a second sidewall and a carbon seal element. The first sidewall is arranged with a first tool die configured from or otherwise including metal. The first tool die centers the first sidewall about an axis. The first sidewall axially contacts the first tool die along the axis. The carbon seal element is arranged with a centering element configured from or otherwise including polymer. The centering element centers the carbon seal element about the axis. The carbon seal element circumscribes and radially contacts the centering element. The second sidewall is arranged with a second tool die configured from or otherwise including metal. The second tool die centers the second sidewall about the axis. The second sidewall axially contacts the second tool die along the axis. The first tool die and the second tool die are moved axially together along the axis to press fit the second sidewall into a bore of the first sidewall and axially capture the carbon seal element between the first sidewall and the second sidewall.

The carbon seal element may be captured axially between the first sidewall and the second sidewall. The first sidewall may include a rim. The second sidewall may be press fit into the rim during the moving of the first tool die and the second tool die axially together along the axis.

The first tool die may also include a first die base. The first die curb may project axially out from the first die base along the axis. The first die curb may extend circumferentially about the axis. The first die bumper may be spaced radially outward from the first die curb by a first die channel. The first die bumper may project axially out from the first die base along the axis. The first die bumper may extend circumferentially about the axis. The second tool die may also include a second die base. The second die curb may project axially out from the second die base along the axis. The second die curb may extend circumferentially about the axis. The second die bumper may be spaced radially outward from the second die curb by a second die channel. The second die bumper may project axially out from the second die base along the axis. The second die bumper may extend circumferentially about the axis.

The first die curb may be configured to radially engage and locate a first sidewall of the seal device within the receptacle. The first die bumper may be configured to axially engage and press against the first sidewall. The second die curb may be configured to radially engage and locate a second sidewall of the seal device within the receptacle. The second die bumper may be configured to axially engage and press against the second sidewall. The centering element may be configured to radially engage and locate a seal element of the seal device disposed between the first sidewall and the second sidewall.

The first die curb may include an outer cylindrical surface configured to radially contact the seal device within the receptacle. The first die bumper may include an annular planar surface configured to axially contact the seal device within the receptacle.

The second die curb may include an outer cylindrical surface configured to radially contact the seal device within the receptacle. The second die bumper may include an annular planar surface configured to axially contact the seal device within the receptacle.

The centering element may include an outer cylindrical surface configured to radially contact a carbon seal element of the seal device within the receptacle.

An axial distal end of the first die bumper may be axially recessed inward towards the first die base from an axial distal end of the first die curb.

The first die base may project radially outward to a first base distal end. The first die bumper may be spaced radially inward from the first base distal end.

The centering element may be attached to the first die base. The centering element may radially abut and/or may be circumscribed by the first die curb.

An axial distal end of the second die bumper may be axially recessed inward towards the second die base from an axial distal end of the second die curb.

The second die base may project radially outward to a second base distal end. The second die bumper may be disposed at the second base distal end.

The first die bumper may have a rectangular sectional geometry. In addition or alternatively, the second die bumper may have a triangular sectional geometry.

The actuator may be configured to move the first tool die and the second tool die towards one another from an open position to a closed position to axially press the seal device between the first tool die and the second tool die. The centering element may be axially spaced from the second tool die by a gap at the closed position.

The first tool die and the second tool die may each be configured from or otherwise include a metal. In addition or alternatively, the centering element may be configured from or otherwise include a polymer.

The actuator may be configured from or otherwise include a linear actuator.

The actuator may include a shaft, a piston and a housing. The shaft may be connected to the first die base. The shaft may project axially along the axis through the centering element and the second tool die into the housing to the piston.

The housing may include a portion of the second tool die.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
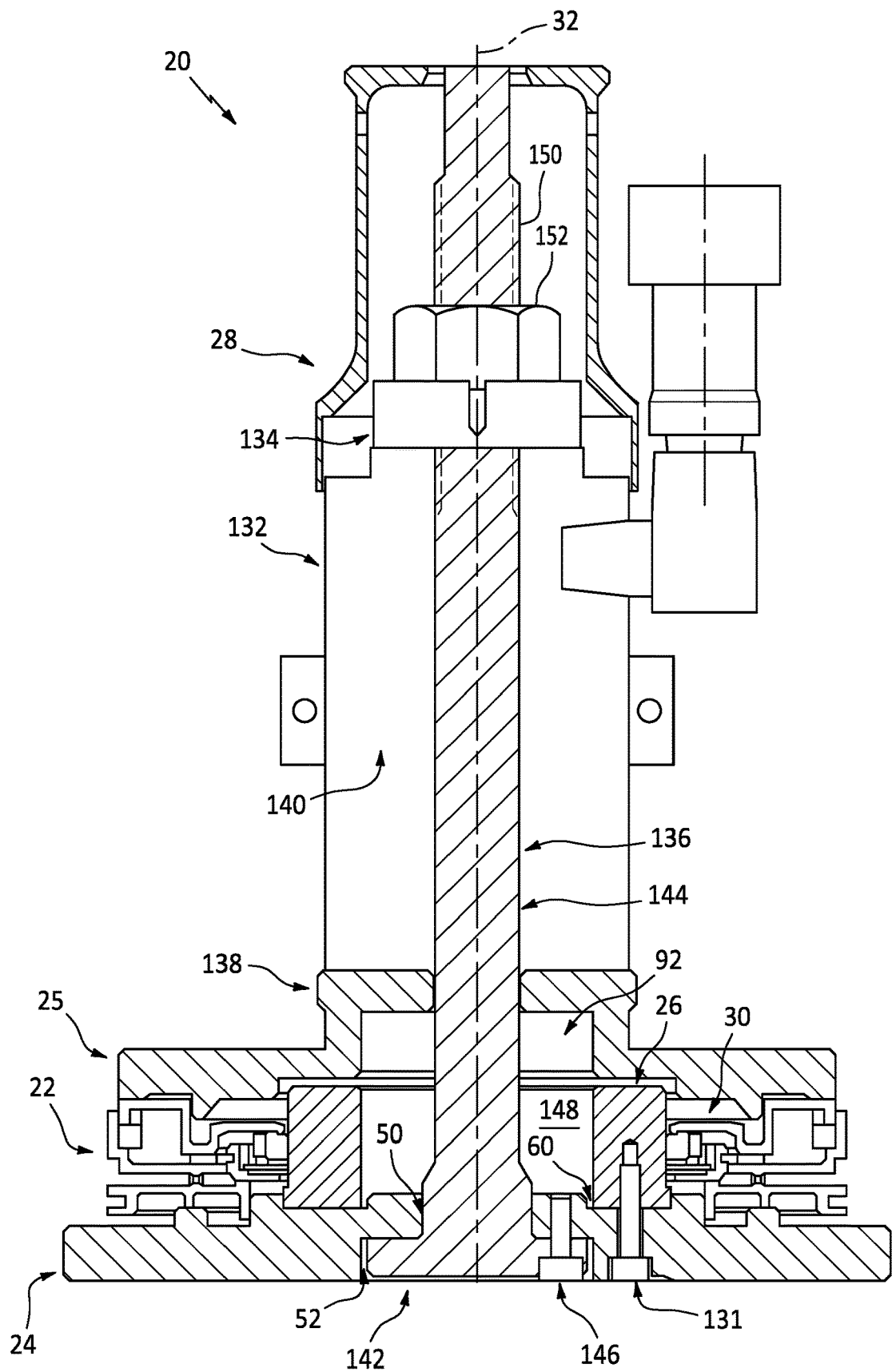
FIG. 1 is a sectional illustration of a tool for assembling a seal device of a gas turbine engine.

FIG. 1 illustrates a tool 20 (e.g., a press) for assembling a seal device 22 of a gas turbine engine. This assembly tool 20 includes a bottom tool die 24, a top tool die 25, a centering element 26 and an actuator 28. The assembly tool 20 is configured with a seal device receptacle 30 in which the seal device 22 is received and assembled during assembly tool operation. It is worth noting, for ease of description, the components 24-26 of the assembly tool 20 are described below with reference to an exemplary orientation shown in FIG. 1. The present disclosure, however, is not limited to such an exemplary orientation. The tool die 24, for example, may alternatively be arranged vertically above the tool die 25 (e.g., the opposite orientation). In another example, the tool dies 24 and 25 may be vertically next to one another where the assembly tool 20 is rotated, for example, ninety degrees.

Figure 2:
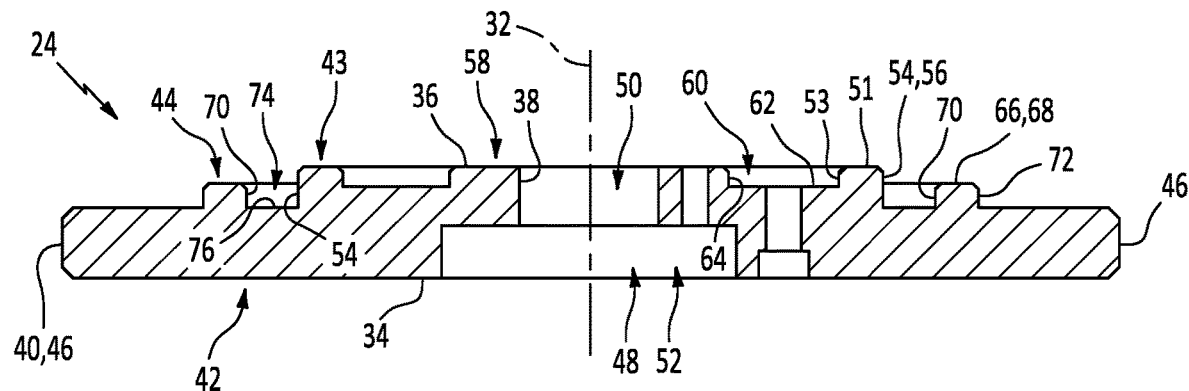
FIG. 2 is a sectional illustration of a bottom tool die for the assembly tool.

Referring to FIG. 2, the bottom tool die 24 extends axially along a centerline axis 32 of the assembly tool 20 (see FIG. 1) between and to a bottom side 34 of the bottom tool die 24 and a top side 36 of the bottom tool die 24, which centerline axis 32 may be parallel (e.g., coaxial) with a centerline axis of the seal device 22 (see FIG. 1). The bottom tool die 24 extends circumferentially about (e.g., completely around) the centerline axis 32, which may provide the bottom tool die 24 with a full-hoop annular body. The bottom tool die 24 extends radially between and to a radial inner side 38 of the bottom tool die 24 and a radial outer side 40 of the bottom tool die 24. The bottom tool die 24 of FIG. 2 includes a bottom die base 42, a bottom die curb 43 and a bottom die bumper 44.

The bottom die base 42 is disposed at (e.g., on, adjacent or proximate) the bottom die bottom side 34. The bottom die base 42 of FIG. 2, for example, extends axially along the centerline axis 32 to the bottom die bottom side 34. The bottom die base 42 extends circumferentially about (e.g., completely around) the centerline axis 32. The bottom die base 42 projects radially out from the bottom die inner side 38 to a bottom die base distal end 46 at the bottom die outer side 40. At the bottom die inner side 38, the bottom die base 42 forms a bottom die aperture 48. This bottom die aperture 48 extends axially along the centerline axis 32 through the bottom tool die 24 and its bottom die base 42. The bottom die aperture 48 of FIG. 2 includes a bore 50 and a counterbore 52. The bore 50 projects axially along the centerline axis 32 into the bottom die base 42 from the bottom die top side 36 to the counterbore 52. The counterbore 52 projects axially along the centerline axis 32 into the bottom die base 42 from the bottom die bottom side 34 to the bore 50.

The bottom die curb 43 is connected to (e.g., formed integral with) the bottom die base 42. The bottom die curb 43 is disposed at the bottom die top side 36. The bottom die curb 43 of FIG. 2, for example, projects axially along the centerline axis 32 in a first axial direction out from the bottom die base 42 to an axial distal end 51 of the bottom die curb 43 at the bottom die top side 36. The bottom die curb 43 extend circumferentially about (e.g., completely around) the centerline axis 32. The bottom die curb 43 extends radially between and to a radial inner side 53 of the bottom die curb 43 and a radial outer side 54 of the bottom die curb 43. The bottom die curb 43 of FIG. 2 has a generally rectangular sectional geometry (with sharp or eased corners) when viewed in a reference plane, for example, parallel with and/or coincident with the centerline axis 32; e.g., the plane of FIG. 2. The bottom die curb 43 of FIG. 2 may include an outer (e.g., cylindrical) surface 56 at the bottom curb outer side 54.

The bottom die curb 43 and its bottom curb inner side 53 are radially spaced from a hub 58 of the bottom die base 42 by an inner channel 60 of the bottom tool die 24. This inner bottom die channel 60 projects axially along the centerline axis 32 into the bottom die tool from the bottom die top side 36 to a channel end 62. The inner bottom die channel 60 extends radially within the bottom tool die 24 between and to the bottom curb inner side 53 and an outer side 64 of the bottom die hub 58. The inner bottom die channel 60 extends within the bottom tool die 24 circumferentially about (e.g., completely around) the centerline axis 32.

The bottom die bumper 44 is connected to (e.g., formed integral with) the bottom die base 42. The bottom die bumper 44 is disposed towards the bottom die top side 36. The bottom die bumper 44 of FIG. 2, for example, projects axially along the centerline axis 32 in the first axial direction out from the bottom die base 42 to an annular (e.g., planar, flat) surface 66 of the bottom die bumper 44 at a distal end 68 of the bottom die bumper 44. This bottom bumper distal end 68 and its bottom bumper surface 66 is (e.g., slightly) recessed axially inward along the centerline axis 32 towards the bottom die base 42 from the bottom curb distal end 51. The bottom die bumper 44 and its bottom bumper surface 66 extend circumferentially about (e.g., completely around) the centerline axis 32. The bottom die bumper 44 extends radially between and to a radial inner side 70 of the bottom die bumper 44 and a radial outer side 72 of the bottom die bumper 44. The bottom die bumper 44 of FIG. 2 has a generally rectangular sectional geometry (with sharp or eased corners) when viewed in the reference plane.

The bottom die bumper 44 and its bottom bumper outer side 72 are spaced radially inward from the bottom die base distal end 46. The bottom die bumper 44 and its bottom bumper inner side 70 are radially spaced from the bottom curb outer side 54 by an outer channel 74 of the bottom tool die 24. This outer bottom die channel 74 projects axially along the centerline axis 32 into the bottom tool die 24 from the bottom die top side 36 to a channel end 76. The outer bottom die channel 74 extends radially within the bottom tool die 24 between and to the bottom curb outer side 54 and bottom bumper inner side 70. The outer bottom die channel 74 extends within the bottom tool die 24 circumferentially about (e.g., completely around) the centerline axis 32.

The bottom tool die 24 may be constructed as a monolithic body from bottom tool die material. This bottom tool die material may be metal such as, but not limited to, steel. The present disclosure, however, is not limited to the foregoing exemplary bottom tool die materials.

Figure 3:
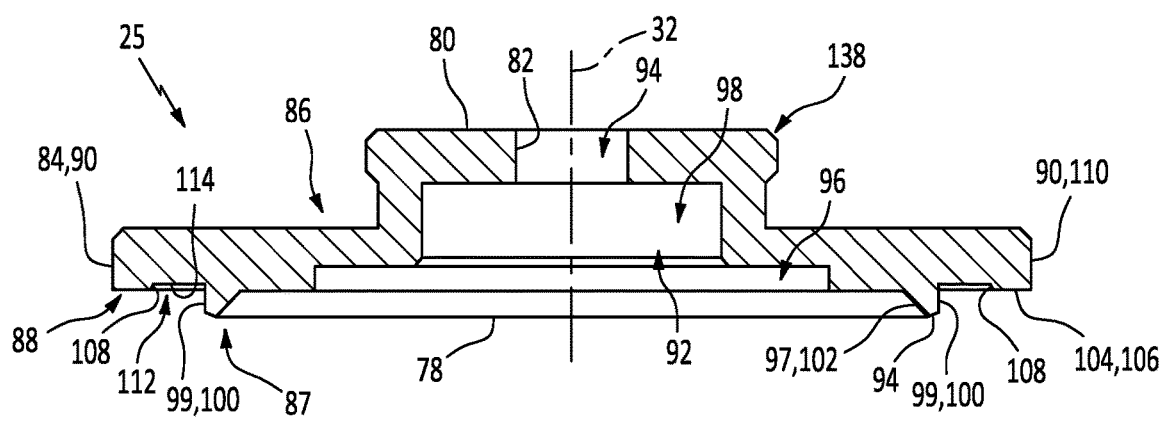
FIG. 3 is a sectional illustration of a top tool die for the assembly tool.

Referring to FIG. 3, the top tool die 25 extends axially along the centerline axis 32 between and to a bottom side 78 of the top tool die 25 and a top side 80 of the top tool die 25. The top tool die 25 extends circumferentially about (e.g., completely around) the centerline axis 32, which may provide the top tool die 25 with a full-hoop annular body. The top tool die 25 extends radially between and to a radial inner side 82 of the top tool die 25 and a radial outer side 84 of the top tool die 25. The top tool die 25 of FIG. 3 includes a top die base 86, a top die curb 87 and a top die bumper 88.

The top die base 86 is disposed at the top die top side 80. The top die base 86 of FIG. 3, for example, extends axially along the centerline axis 32 to the top die top side 80. The top die base 86 extends circumferentially about (e.g., completely around) the centerline axis 32. The top die base 86 projects radially out from the top die inner side 82 to a top die base distal end 90 at the top die outer side 84. At the top die inner side 82, the top die base 86 forms a top die aperture 92. This top die aperture 92 extends axially along the centerline axis 32 through the top tool die 25 and its top die base 86. The top die aperture 92 of FIG. 3 includes a bore 94 and one or more counterbores 96 and 98. The bore 94 projects axially along the centerline axis 32 into the top die base 86 from the top die bottom side 78 to the interior counterbore 98. The exterior counterbore 96 projects axially along the centerline axis 32 into the top die base 86 from the top die top side 80 to the interior counterbore 98. The interior counterbore 98 extends axially along the centerline axis 32 within the top die base 86 between and to the bore 94 and the exterior counterbore 96.

The top die curb 87 is connected to (e.g., formed integral with) the top die base 86. The top die curb 87 is disposed at the top die bottom side 78. The top die curb 87 of FIG. 3, for example, projects axially along the centerline axis 32 in a second axial direction (opposite the first axial direction) out from the top die base 86 to an axial distal end 94 of the top die curb 87 at top die bottom side 78. The top die curb 87 extend circumferentially about (e.g., completely around) the centerline axis 32. The top die curb 87 extends radially between and to a radial inner side 97 of the top die curb 87 and a radial outer side 99 of the top die curb 87. The top die curb 87 of FIG. 3 has a generally triangular sectional geometry (with a sharp or eased tip) when viewed in the reference plane; e.g., the plane of FIG. 3. The top die curb 87 of FIG. 3 may include an outer (e.g., cylindrical) surface 100 at the top curb outer side 99, and an inner (e.g., frustoconical) surface 102 at the top curb inner side 97. The top curb inner surface 102 may meet the top curb outer surface 100 at the tip of the top die curb 87.

The top die curb 87 and its top curb inner side 97 is radially spaced from a radial outer edge of the exterior counterbore 96.

The top die bumper 88 is connected to (e.g., formed integral with) the top die base 86. The top die bumper 88 is disposed towards the top die bottom side 78. The top die bumper 88 of FIG. 3, for example, projects axially along the centerline axis 32 in the second axial direction out from the top die base 86 to an annular (e.g., planar, flat) surface 104 of the top die bumper 88 at a distal end 106 of the top die bumper 88. This top bumper distal end 106 and its top bumper surface 104 is (e.g., slightly) recessed axially inward along the centerline axis 32 towards the bottom die base 42 from the top curb distal end 94. The top die bumper 88 and its top bumper surface 104 extend circumferentially about (e.g., completely around) the centerline axis 32. The top die bumper 88 extends radially between and to a radial inner side 108 of the top die bumper 88 and a radial outer side 110 of the top die bumper 88; e.g., the top die base distal end 90 in FIG. 3. The top die bumper 88 of FIG. 3 has a generally rectangular sectional geometry (with sharp or eased corners) when viewed in the reference plane.

The top die bumper 88 and its top bumper inner side 108 are radially spaced from the top curb outer side 99 by a channel 112 of the top tool die 25. This top die channel 112 projects axially along the centerline axis 32 into the top tool die 25 from the top die bottom side 78 to a channel end 114. The top die channel 112 extends radially within the top tool die 25 between and to the top curb outer side 99 and top bumper inner side 108. The top die channel 112 extends within the top tool die 25 circumferentially about (e.g., completely around) the centerline axis 32.

The top tool die 25 may be constructed as a monolithic body from top tool die material. This top tool die material may be metal such as, but not limited to, steel. The present disclosure, however, is not limited to the foregoing exemplary top tool die materials.

Figure 4:
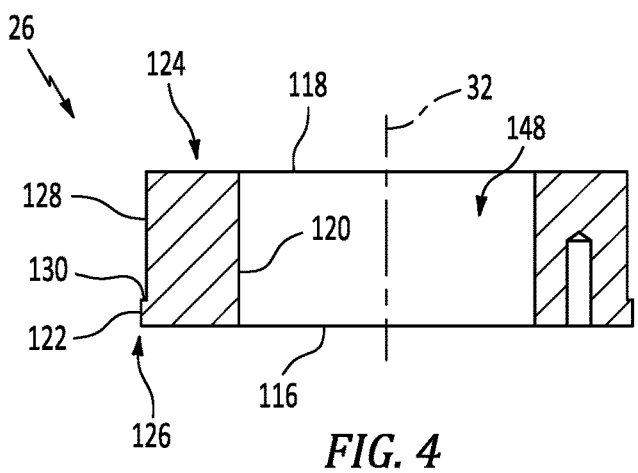
FIG. 4 is a sectional illustration of a centering element for the assembly tool.

Referring to FIG. 4, the centering element 26 extends axially along the centerline axis 32 between and to a bottom side 116 of the centering element 26 and a top side 118 of the centering element 26. The centering element 26 extends circumferentially about (e.g., completely around) the centerline axis 32, which may provide the centering element 26 with a full-hoop tubular body. The centering element 26 extends radially between and to a radial inner side 120 of the centering element 26 and a radial outer side 122 of the centering element 26. The centering element 26 of FIG. 4 includes a tubular centering element base 124 and an annular centering element rim 126.

The element base 124 extends axially along the centerline axis 32 between and to the element bottom side 116 and the element top side 118. The element base 124 extends radially between and to the element inner side 120 and an outer (e.g., cylindrical) surface 128 at or about the element outer side 122. The element base 124 extends circumferentially about (e.g., completely around) the centerline axis 32.

The element rim 126 is connected to (e.g., formed integral with) the element base 124. The element rim 126 is disposed at the element bottom side 116 and the element outer side 122. The element rim 126 of FIG. 4, for example, extends axially along the centering axis 32 between and to the element bottom side 116 and a top side 130 of the element rim 126 that is axially spaced from the element top side 118. The element rim 126 projects radially out from the element base 124 and its base outer surface 128 to the element outer side 122. The element rim 126 extends circumferentially about (e.g., completely around) the centerline axis 32.

The centering element 26 may be constructed as a monolithic body from centering element material. This centering element material may be relatively soft or compliant material (compared to metal) such as, but not limited to, polymer; e.g., thermoplastic. The present disclosure, however, is not limited to the foregoing exemplary centering element materials.

Referring to FIG. 1, the assembly tool components 24-26 are aligned together along the centerline axis 32. The centering element 26 is mated with the bottom tool die 24. The centering element 26 of FIG. 1, for example, is seated in the inner bottom die channel 60. This centering element 26 may be attached to the bottom tool die 24 with one or more fasteners 131. The centering element 26 is arranged axially along the centerline axis 32 between the bottom tool die 24 and the top tool die 25. With this arrangement, the seal device receptacle 30 projects radially (inwards towards the centerline axis 32) into the assembly tool 20 to the centering element 26. The seal device receptacle 30 extends axially within the assembly tool 20 between and to the bottom tool die 24 and the top tool die 25. The seal device receptacle 30 extends circumferentially within the assembly tool 20 about (e.g., completely around) the centerline axis 32 and the centering element 26.

The actuator 28 may be configured as a linear actuator. The actuator 28 of FIG. 1, for example, is configured as a hydraulic cylinder actuator. The actuator 28 of FIG. 1 includes an actuator housing 132, an actuator piston 134 and an actuator drive element 136. A bottom end section of the housing 132 of FIG. 1 may be formed by a hub 138 of the top tool die 25. The piston 134 is disposed within an internal chamber 140 (e.g., a sealed cavity) of the housing 132. The drive element 136 of FIG. 1 includes a head 142 and a shaft 144 connected to (e.g., formed integral with) the shaft 144. The head 142 is mated with the bottom tool die 24. The head 142 of FIG. 1, for example, is seated within the counterbore 52, and the head 142 may be attached to the bottom tool die 24 with one or more fasteners 146. The shaft 144 projects axially along the centerline axis 32 out from the head 142, sequentially through the bore 50, an inner bore 148 of the centering element 26 and the top die aperture 92, and into the chamber 140 to the piston 134. The shaft 144 is connected to the piston 134. A threaded portion 150 of the shaft 144 in FIG. 1, for example, projects axially along the centerline axis 32 through the piston 134, and this threaded shaft portion 150 is attached to the piston 134 with a nut 152.

During operation of the assembly tool 20 of FIG. 1, hydraulic fluid may be directed into the chamber 140 to push the piston 134 axially along the centerline axis 32 away from the top die hub 138. The piston 134 may thereby move, via the drive element 136, the bottom tool die 24 and the top tool die 25 axially along the centerline axis 32 towards one another from a first (e.g., open, relaxed) position to a second (e.g., closed, press) position of FIG. 1. The axial movement may press and hold components of the seal device 22 together.

Figure 5:
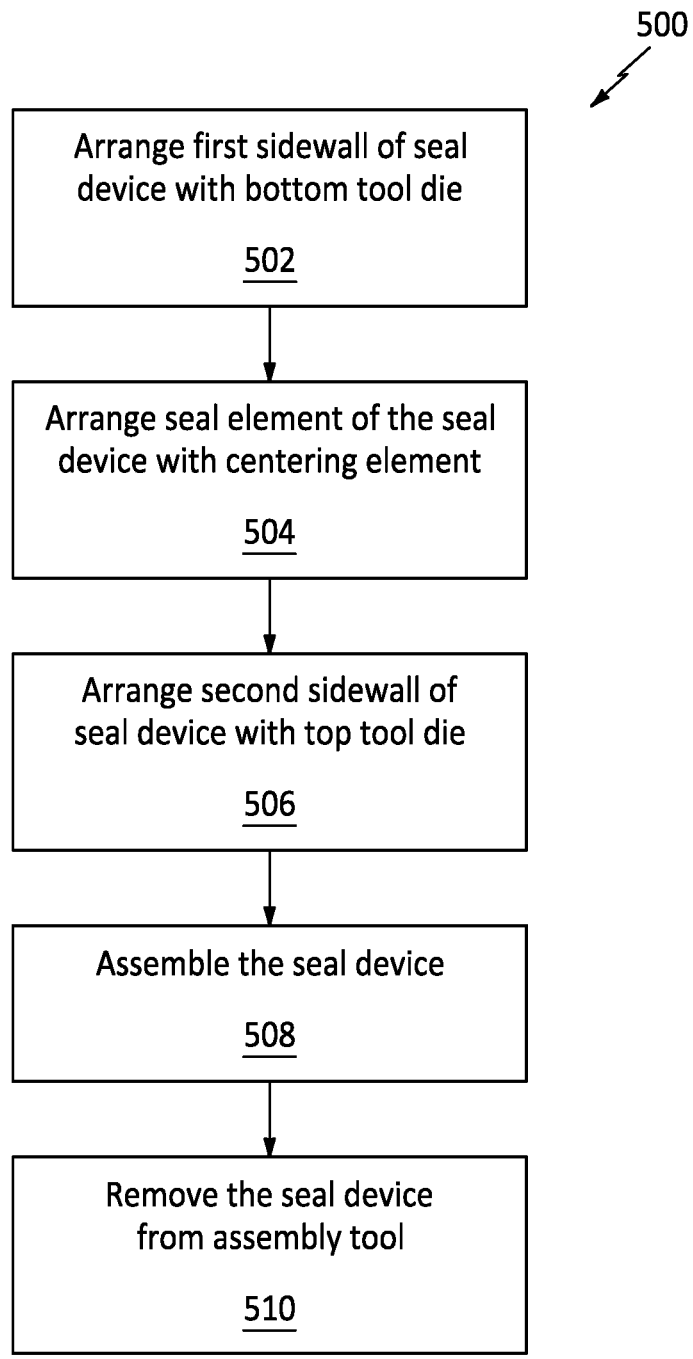
FIG. 5 is a flow diagram of a method for manufacturing the seal device.
Figure 6:
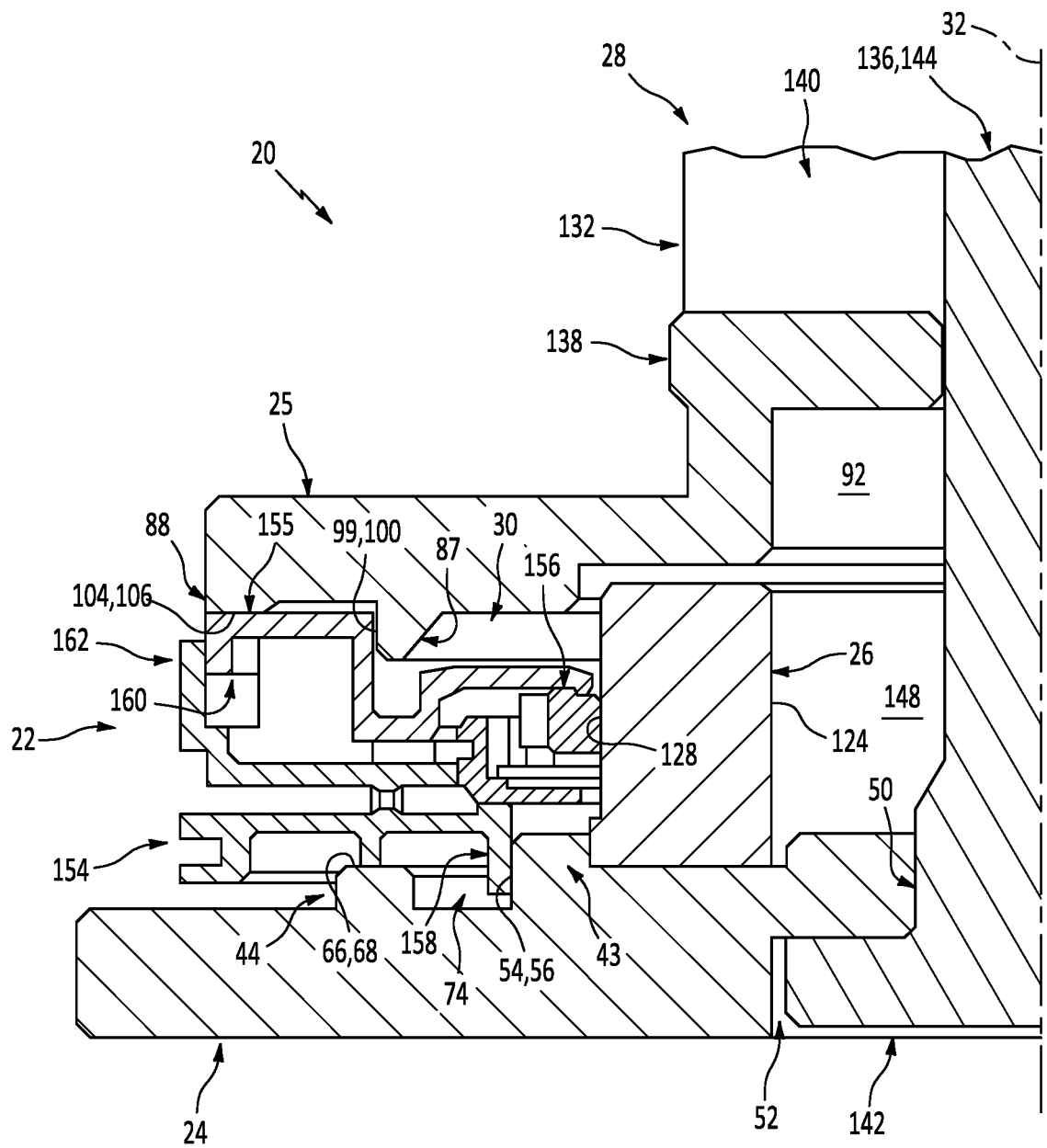
FIG. 6 is a sectional illustration of a portion of the seal device during assembly with the assembly tool.

FIG. 5 is a flow diagram of a method 500 for manufacturing (e.g., assembling) the seal device 22. Referring to FIG. 6, the seal device 22 may include a first sidewall 154, a second sidewall 155 and a carbon seal element 156. The seal device 22 may also include one or more additional internal components such as, but not limited to, a spring element and a spacer.

In step 502, the first sidewall 154 is arranged with the bottom tool die 24. The first sidewall 154, more particularly, is mated with the bottom die curb 43 and the bottom die bumper 44. An inner flange 158 of the first sidewall 154 of FIG. 6, for example, is received within (e.g., projects axially into) the outer bottom die channel 74. The first sidewall 154 and its inner flange 158 circumscribe the bottom die curb 43. The first sidewall 154 and its inner flange 158 radially engage (e.g., contact, abut against, etc.) the bottom curb surface 56. This engagement radially locates the first sidewall 154 about (e.g., aligns a centerline of the first sidewall 154 with) the centerline axis 32. The first sidewall 154 also axially engages the bottom die bumper 44 and its surface 66. An interface between the first sidewall 154 and the bottom die bumper 44 may be the only axial engagement between the first sidewall 154 and the bottom tool die 24; however, the present disclosure is not limited thereto.

In step 504, the seal element 156 is arranged with the centering element 26. The centering element 26 of FIG. 6, for example, is received within (e.g., projects axially through) an inner bore of the seal element 156. The seal element 156 circumscribes the centering element 26 and its element base 124. The seal element 156 radially engages the base outer surface 128. This engagement radially locates the seal element 156 about (e.g., aligns a centerline of the centering element 26 with) the centerline axis 32 and with the first sidewall 154. During this step, the other components (e.g., the spring element, etc.) of the seal device 22 may also be arranged with the seal element 156 and/or the first sidewall 154.

In step 506, the second sidewall 155 is arranged with the top tool die 25. The second sidewall 155, more particularly, is mated with the top die curb 87 and the top die bumper 88. An outer portion 160 of the second sidewall 155 of FIG. 6, for example, circumscribe the top die curb 87. The first sidewall 154 and its outer portion 160 radially engage the top curb outer surface 100. This engagement radially locates the second sidewall 155 about (e.g., aligns a centerline of the second sidewall 155 with) the centerline axis 32. The second sidewall 155 and its outer portion 160 also axially engage the top die bumper 88. An interface between the second sidewall 155 and the top die bumper 88 may be the only axial engagement between the second sidewall 155 and the top tool die 25; however, the present disclosure is not limited thereto.

In step 508, the seal device 22 is assembled. The actuator 28 of FIG. 1, for example, may be assembled with the assembly tool components 24-26. The hydraulic fluid may be directed into the chamber 140 to pull the bottom tool die 24 and the top tool die 25 axially together along the centerline axis 32 to the second position of FIGS. 1 and 6. This relative movement of the bottom tool die 24 and the top tool die 25 presses the first sidewall 154 and the second sidewall 155 together. The second sidewall 155 and its outer portion 160 of FIG. 6, for example, may be pressed axially into a tubular outer rim 162 of the first sidewall 154 to provide a radial interference fit between the outer portion 160 and the outer rim 162. To facilitate this pressing, at least the first sidewall 154 and its outer rim 162 may be heated to increase an inner diameter of the outer rim 162 through thermal expansion. The assembly tool 20 may maintain its components 24-26 in the second position of FIG. 6 until, for example, the first sidewall 154 and its outer rim 162 contracts onto the second sidewall 155 and its outer portion 160 enough to secure these sidewalls 154 and 155 together. With this arrangement, the seal element 156 and the other components (e.g., the spring element, etc.) are captured between the first sidewall 154 and the second sidewall 155.

In step 510, the assembly seal device 22 is removed from the assembly tool 20. The hydraulic fluid, for example, may be directed out of (e.g., evacuated from) the chamber 140 to place the bottom tool die 24 and the top tool die 25 in their first (e.g., open) position. The actuator 28 may then be disassembled to remove the seal device 22.

The seal device 22 of FIGS. 1 and 6 may be included in various gas turbine engines. The seal device 22, for example, may be included in a geared gas turbine engine where a gear train connects one or more shafts to one or more rotors in a fan section, a compressor section and/or any other engine section. Alternatively, the seal device 22 may be included in a direct drive gas turbine engine configured without a gear train. The seal device 22 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A tool for assembling a seal device of a gas turbine engine, the tool comprising:
   a first tool die including a first die base, a first die curb and a first die bumper, the first die curb projecting axially out from the first die base along an axis, the first die curb extending circumferentially about the axis, the first die bumper spaced radially outward from the first die curb by a first die channel, the first die bumper projecting axially out from the first die base along the axis, and the first die bumper extending circumferentially about the axis;
   a second tool die including a second die base, a second die curb and a second die bumper, the second die curb projecting axially out from the second die base along the axis, the second die curb extending circumferentially about the axis, the second die bumper spaced radially outward from the second die curb by a second die channel, the second die bumper projecting axially out from the second die base along the axis, and the second die bumper extending circumferentially about the axis;
   a centering element extending axially along and circumferentially about the axis;
   a receptacle configured to receive the seal device, the receptacle extending axially along the axis within the tool between the first tool die and the second tool die, and the receptacle projecting radially inward into the tool to the centering element; and
   an actuator configured to axially press the seal device between the first tool die and the second tool die;
   wherein the first tool die and the second tool die each comprise a metal, and the centering element comprises a polymer.

2. The tool of claim 1, wherein
   the first die curb is configured to radially engage and locate a first sidewall of the seal device within the receptacle, and the first die bumper is configured to axially engage and press against the first sidewall;
   the second die curb is configured to radially engage and locate a second sidewall of the seal device within the receptacle, and the second die bumper is configured to axially engage and press against the second sidewall; and
   the centering element is configured to radially engage and locate a seal element of the seal device disposed between the first sidewall and the second sidewall.

3. The tool of claim 1, wherein
   the first die curb comprises an outer cylindrical surface configured to radially contact the seal device within the receptacle; and
   the first die bumper comprises an annular planar surface configured to axially contact the seal device within the receptacle.

4. The tool of claim 1, wherein
   the second die curb comprises an outer cylindrical surface configured to radially contact the seal device within the receptacle; and
   the second die bumper comprises an annular planar surface configured to axially contact the seal device within the receptacle.

5. The tool of claim 1, wherein the centering element comprises an outer cylindrical surface configured to radially contact a carbon seal element of the seal device within the receptacle.

6. The tool of claim 1, wherein an axial distal end of the first die bumper is axially recessed inward towards the first die base from an axial distal end of the first die curb.

7. The tool of claim 1, wherein
   the first die base projects radially outward to a first base distal end; and
   the first die bumper is spaced radially inward from the first base distal end.

8. The tool of claim 1, wherein
   the centering element is attached to the first die base; and the centering element radially abuts and is circumscribed by the first die curb.

9. The tool of claim 1, wherein an axial distal end of the second die bumper is axially recessed inward towards the second die base from an axial distal end of the second die curb.

10. The tool of claim 1, wherein
the second die base projects radially outward to a second base distal end; and
the second die bumper is disposed at the second base distal end.

11. The tool of claim 1, wherein at least one of
the first die bumper has a rectangular sectional geometry; or
the second die bumper has a triangular sectional geometry.

12. The tool of claim 1, wherein
the actuator is configured to move the first tool die and the second tool die towards one another from an open position to a closed position to axially press the seal device between the first tool die and the second tool die; and
the centering element is axially spaced from the second tool die by a gap at the closed position.

13. The tool of claim 1, wherein the actuator comprises a linear actuator.

14. The tool of claim 1, wherein
the actuator comprises a shaft, a piston and a housing; and
the shaft is connected to the first die base, and the shaft projects axially along the axis through the centering element and the second tool die into the housing to the piston.

15. The tool of claim 14, wherein the housing comprises a portion of the second tool die.

16. A tool for assembling a seal device of a gas turbine engine, the tool comprising:
a first tool die including a first die base, a first die curb, a first die bumper and an annular inner channel, the first die curb projecting axially out from the first die base along an axis, the first die curb extending circumferentially about the axis, the first die bumper spaced radially outward from the first die curb by a first die channel, the first die bumper projecting axially out from the first die base along the axis, and the first die bumper extending circumferentially about the axis;
a second tool die including a second die base, a second die curb and a second die bumper, the second die curb projecting axially out from the second die base along the axis, the second die curb extending circumferentially about the axis, the second die bumper spaced radially outward from the second die curb by a second die channel, the second die bumper projecting axially out from the second die base along the axis, and the second die bumper extending circumferentially about the axis;
a centering element projecting axially along the axis into the annular inner channel, the centering element extending circumferentially about the axis;
a receptacle configured to receive the seal device, the receptacle extending axially along the axis within the tool between the first tool die and the second tool die, and the receptacle projecting radially inward into the tool to the centering element; and
an actuator configured to axially press the seal device between the first tool die and the second tool die.

17. A tool for assembling a seal device of a gas turbine engine, the tool comprising:
a first tool die including a first die base, a first die curb and a first die bumper, the first die curb projecting axially out from the first die base along an axis, the first die curb extending circumferentially about the axis, the first die bumper spaced radially outward from the first die curb by a first die channel, the first die bumper projecting axially out from the first die base along the axis, and the first die bumper extending circumferentially about the axis;
a second tool die including a second die base, a second die curb and a second die bumper, the second die curb projecting axially out from the second die base along the axis, the second die curb extending circumferentially about the axis, the second die bumper spaced radially outward from the second die curb by a second die channel, the second die bumper projecting axially out from the second die base along the axis, and the second die bumper extending circumferentially about the axis;
a centering element extending axially along and circumferentially about the axis, the centering element attached to the first tool die by one or more fasteners;
a receptacle configured to receive the seal device, the receptacle extending axially along the axis within the tool between the first tool die and the second tool die, and the receptacle projecting radially inward into the tool to the centering element; and
an actuator configured to axially press the seal device between the first tool die and the second tool die.

18. The tool of claim 17, wherein the centerline element comprises a polymer.

19. The tool of claim 18, wherein at least one of the first tool die or the second tool die comprise a metal.

* * * * *